H. E. DELESSERT.
Carriages.
No. 141,704. Patented August 12, 1873.
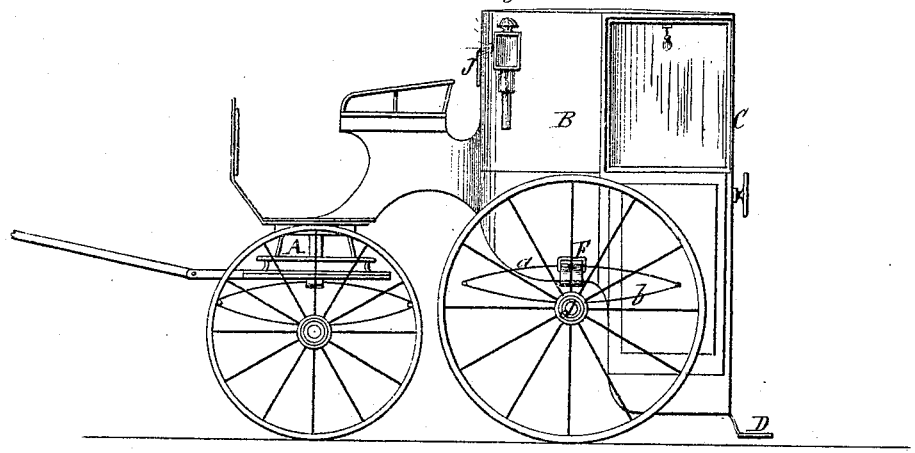
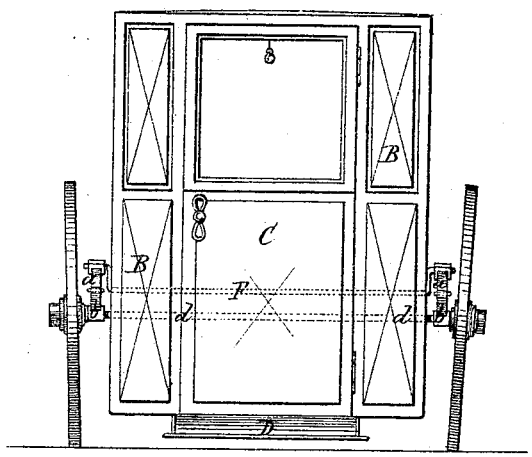
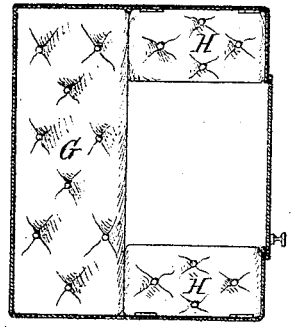

UNITED STATES PATENT OFFICE.

HENRI E. DELESSERT, OF PARIS, FRANCE.

IMPROVEMENT IN CARRIAGES.

Specification forming part of Letters Patent No. 141,704, dated August 12, 1873; application filed March 21, 1873.

*To all whom it may concern:*

Be it known that I, HENRI EDOUARD DELESSERT, of Paris, in the Republic of France, have invented a new Improvement in Carriages; and I do hereby declare the following, when taken in connection with the accompanying drawings and the letters of reference marked thereon, to be a full, clear, and exact description of the same, and which said drawings constitute part of this specification, and represent, in—

Figure 1, a longitudinal elevation; Fig. 2, a back view of a brougham or carriage; Fig. 3, a sectional plan of the body of the carriage.

This invention relates to the construction of a brougham, or carriage of like character, in such a manner as to give easy access to passengers, to leave their view uninterrupted, and to permit the hind wheels to be placed near the front wheels, so as to lighten the draft without interfering with the accommodation of or facility of access to the vehicle.

For this purpose I construct and arrange the fore carriage with its wheels and the driver's seat in the usual manner; but I form the body of the carriage with its door opening at the back, and with its seat over the hind axle, so that the passengers sit with their backs to the driver, and can see freely out through the glass in the door or on each side thereof. They can communicate with the driver by a window behind them, opening to the front of the carriage. Instead of or in addition to the seat, as above described, there may be seats, one on each side of the carriage, with the passage from the door between them.

For the purpose before mentioned, I construct and arrange the fore carriage A with its wheels and the driver's seat in the usual manner; but I form the body B of the carriage with its door C opening at the back, and with its seat G, Fig. 3, over the hind axle $d$, so that the passengers sit with their backs to the driver, and can see freely out through the glass in the door C, or one each side thereof. They can communicate with the driver by a window, J, behind them, opening to the front of the carriage.

Instead of or in addition to the seat G, as above described, there may be seats H H, one on each side of the carriage-body, with the passage from the door between them.

As the hind axle $d$ passes under the seat G it can be placed farther forward or nearer to the front axle than usual, and the draft is then lightened; also, the body B of the carriage is then mounted lower than usual, so that it may easily be entered from the road level, a broad step or foot-board, D, being arranged at the door behind, and the wheels being in such a position that they do not interfere with access.

The springs $a$ $b$ are conveniently made of the elliptic kind, their lower sweeps $b$ resting on the hind axle $d$, one on each side of the carriage-body.

A transverse-kneed bar, F, which passes under the seat of the carriage, is suspended at each end from the upper sweeps $a$ of the springs, and the carriage, resting on this bar, is thus supported on the hinder springs.

This improved carriage may be mounted on four or two wheels. In this last case the body B of the carriage will be hollowed at each side in order to lodge the springs; also, the driver's seat is fixed on the top part of the body B.

I claim as my invention—

1. The combination and arrangement of a brougham or carriage, substantially as before described, the body of which extends down in the rear of the rear axle, and with the door opening at the rear, the principal seat being directly over the said rear axle.

2. The arrangement of the springs, the lower sweeps of which resting on the hind axle, one on each side of the carriage, and the upper sweeps being suspended to a transverse-kneed bar which passes under the seat of the carriage, as described.

In testimony whereof I have signed my name to this specification before two subscribing witnesses.

H. ED. DELESSERT.

Witnesses:
J. ARMENGAUD, Jr.,
ALBERT COHEN.